United States Patent [19]

Moore

[11] 4,205,304
[45] May 27, 1980

[54] TWO DIMENSIONAL LIGHT BEAM SELECTION SYSTEM

[75] Inventor: Stanley E. Moore, Los Gatos, Calif.

[73] Assignee: General Electric Company, San Jose, Calif.

[21] Appl. No.: 835,718

[22] Filed: Sep. 22, 1977

[51] Int. Cl.² .................... G28C 1/00; G21C 7/00; G08C 21/00

[52] U.S. Cl. ................ 340/365 P; 176/19 EC; 176/24; 178/18; 340/707

[58] Field of Search ............ 176/19 R, 195, 19 EC, 176/24; 364/504, 822; 178/18, 19, 20; 340/146.3 MA, 166 R, 166 EL, 334, 335, 337, 365 P, 707; 324/75, 96, 97; 250/221, 578

[56] References Cited

U.S. PATENT DOCUMENTS

| | | | |
|---|---|---|---|
| 3,128,340 | 4/1964 | Harmon | 178/18 |
| 3,478,220 | 11/1969 | Milroy | 340/365 P |
| 3,495,232 | 2/1970 | Wagner | 178/18 |
| 3,613,066 | 10/1971 | Cooreman | 178/18 |
| 3,653,031 | 3/1972 | Hlady | 178/18 |
| 3,962,698 | 6/1976 | Hunt | 340/166 R |
| 4,022,969 | 5/1977 | McKinlay | 450/324 M |

OTHER PUBLICATIONS

IEEE, Spectrum, Nov. 1976, p. 70.

*Primary Examiner*—Charles T. Jordan
*Assistant Examiner*—Donald P. Walsh
*Attorney, Agent, or Firm*—Ivor J. James, Jr.; Samuel E. Turner; Raymond G. Simkins

[57] ABSTRACT

A position selection system comprising a map of a plurality of selection positions arranged in columns and rows with a normally unenergized light emitter and a respective normally disabled light detector positioned at opposie ends of each of the columns and rows. The light emitters are sequentially energized and the respective light detectors are synchronously sequentially enabled to thereby avoid the necessity of collimating light from the light emitters.

12 Claims, 6 Drawing Figures

TWO DIMENSIONAL LIGHT BEAM SELECTION SYSTEM

BACKGROUND OF THE INVENTION

There are many applications for position or coordinate selection systems such as in data input and output systems and in various control systems.

A notable example of a position selection system is the control rod selection system of a nuclear reactor. Such control rods contain a neutron absorbing material and they are selectively moveable into and out of the nuclear fuel core to control the neutron population and hence the power level of the core. Also, by varying the depth of insertion of the various control rods, the shape of the neutron flux curve can be controlled. An example of a control rod and system is shown in U.S. Pat. No. 3,020,887. A typical nuclear power reactor core may contain 200 or more of such control rods.

In such a control rod system, means are required to sense and indicate the axial position or depth of insertion of each control rod in the core. Such a sensing and indicating system is shown, for example, in U.S. Pat. No. 3,217,307.

Also required, in the control room of the nuclear plant, is a display or map (e.g. a plan view) of the radial positions of the control rods and selection, indicating and control means by which an operator may select a particular control rod and cause its movement into or out of the core as desired.

In a typical system the selection positions of the control rod map are marked or legended with the X-Y coordinates of the control rods and the legends are arranged in columns and rows corresponding to the plan view positions of the control rods in the core.

In a known system a manually operable key or push button is positioned adjacent each selection position and a particular control rod is selected by depressing its associated push button which mechanically closes an electrical switch. Such selection of a control rod energizes a display showing the insertion position of the control rod and enables appropriate controls by which the operator may selectively cause movement of the control rod.

While such known selection systems have well served their purposes, improvement therein is desirable in several respects, for example, as follows: Since it is desirable that many essential displays and controls be available at a single operator position at a control room console, space is at a premium on the panels of such a console. It is desirable to eliminate the array of selection push buttons because they occupy considerable space on the selection map which can otherwise be used to reduce the size of the map and/or to provide display space. It is also desirable to eliminate the manually operable push buttons and their associated electrical contacts for reliability reasons.

Because of the importance of control rod control to reactor safety it is desirable to provide separate and redundant selection and control systems. While duplicates of the electrical and electronic components can be provided with minimum impact on panel space, duplication of the control rod map and push button array would be virtually intolerable. Thus in the past a degree of redundancy has been achieved by providing an additional set of contacts on the push buttons. A more complete separation of the two systems is desirable.

Thus an object of the invention is a compact and reliable selection system. Another object is to eliminate mechanically actuated electrical contacts from a selection system. A further object is a selection system with two separate channels with minimum interaction between channels.

SUMMARY

These and other objects are achieved by a selection system comprising a map of a plurality of selection positions arranged in columns and rows with a normally unenergized light emitter and a respective normally disabled light detector at opposite ends of each of the columns and rows. A strobe circuit produces a train of strobe pulses for energizing the light emitters and enabling the respective light detectors of the columns and rows sequentially and cyclically, the enablement of the rows being advanced one row for each cycle of strobing of the columns.

Selection of a particular selection position is accomplished by placing a light obstruction, such as a finger, but preferably a nonreflective stylus, at the intersection of the particular column and the particular row which identifies the selected selection position. As the columns and rows are strobed, the stylus interrupts the light from the light emitters of the particular column and particular row to their respective light detectors. This absence of light at the light detectors of the particular column and particular row is detected by logic circuitry and an indication of the selection position is stored and is available for display, enablement of control circuits and the like.

Because the light detectors are strobed or sequentially enabled in synchronism with the energization of the light emitters, light from the light emitter of a particular column or row falling on the disabled light detectors of adjacent columns or rows has no effect. Therefore, the expense and space of collimating means for the light from the light emitters is not required.

Another feature of the invention is the provision of two separate selection channels associated with the same selection system map. The light emitters and light detectors of the second channel are displaced in the Z direction (that is, in a direction perpendicular to the plane of the map) from those of the first channel. Furthermore, the positions of the light emitters and light detectors of the second channel are reversed with respect to those of the first channel so that light interference between the two channels is avoided.

DRAWING

The invention is described more specifically hereinafter with reference to the accompanying drawing wherein.

DESCRIPTION

Figure 1:
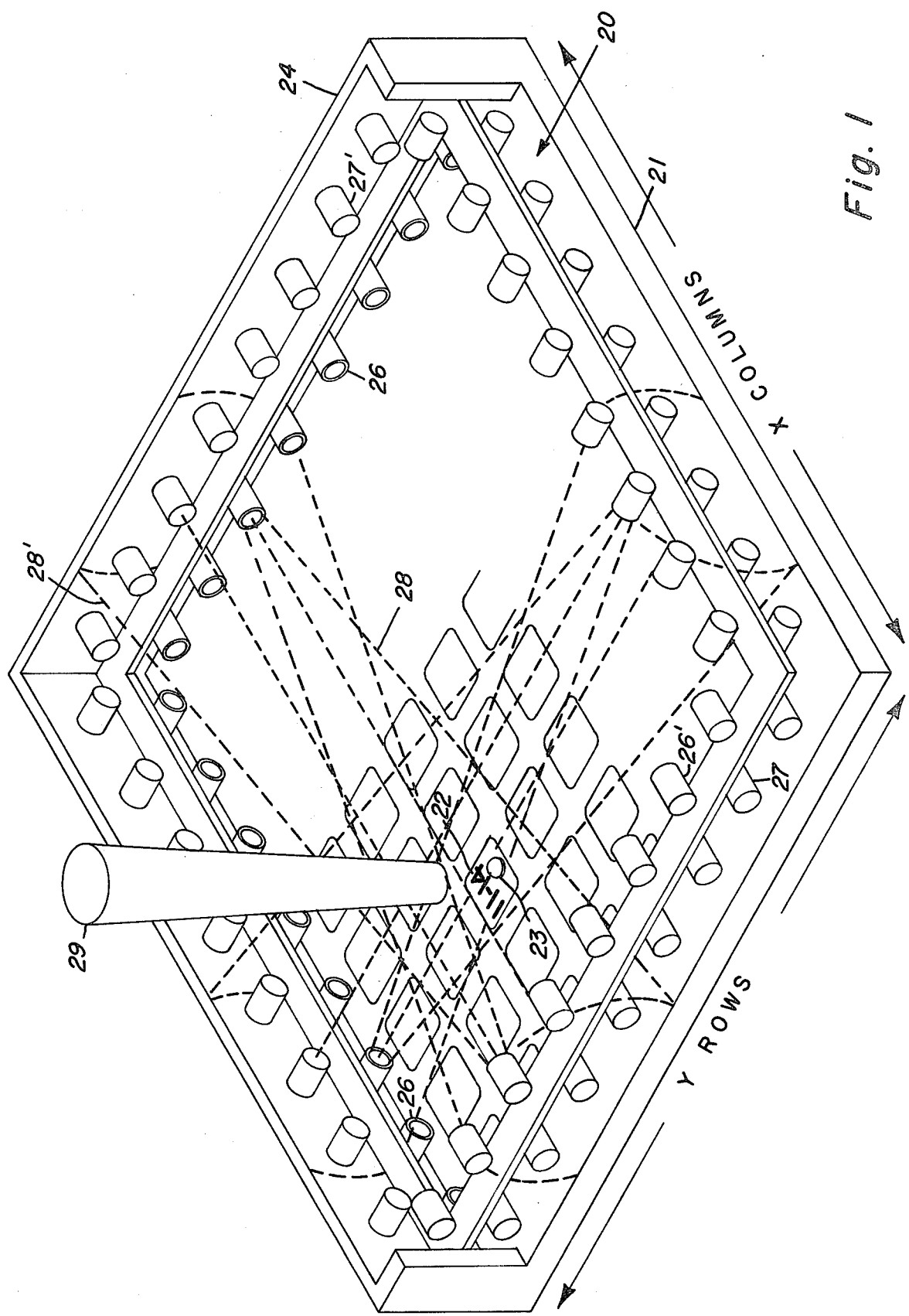
FIG. 1 is a partly cut away perspective view of a map arrangement of the selection system.

Shown in FIG. 1 is a map arrangement of an example dual channel selection system according to the invention. The map 20 is formed on a base 21 and selection positions 22 are formed thereon in any suitable visually distinguishable manner and form such as printing, engraving or the like. In FIG. 1, the selection positions 22 are illustrated as local square-shaped areas arranged in columns and rows, that is, in an X-Y coordinate system. Each of the selection positions 22 is suitably marked with an identification legend, for example, the X-Y coordinate position number of a control rod of a nuclear reactor.

Each selection position 22 may also include a position selection indicator, such as a light 23, which can be energized to indicate that the position has been selected.

The base 21 is surrounded by a frame 24 which supports a plurality of light emitters 26 and light detectors 27 of a first channel and a plurality of emitters 26' and detectors 27' of a second or redundant channel displaced from those of the first channel in a direction perpendicular to the plane of the map 20. These emitters 26, 26' and detectors 27, 27' are arranged such that there is a light emitter at one end and a light detector at the other end of each column and each row of selection positions 22 in each channel.

It is a feature of the invention that the positions of the light emitters 26' and the light detectors 27' of the second channel at the ends of the rows and columns are reversed with respect to those of the first channel. For example, as illustrated in FIG. 1, a light emitter 26 of the first channel emits a beam of light 28 across the map 20 in one direction while a light emitter 26' of the second channel emits a light beam 28' across the map in the opposite direction. In this manner, the light beams of one channel do not fall upon the light detectors of the other channel, and thus, light interference between the two channels is avoided.

It will be noted that the light beams 28 and 28' are not collimated but instead may spread and fall upon the light detectors of adjacent columns (or rows). The energizing and strobing circuitry described hereinafter overcomes this effect whereby expensive and bulky collimating means is not required.

To select a particular selection position 2, a light obstructing object, of suitable shape, such as a stylus 29, is placed at that particular selection position to cut off the light transmission between the light emitters and light detectors of the column and row which intersect at that selection position. The absence of light at the detectors is detected to identify and store an indication of the selected selection position by the circuitry described hereinafter.

In FIG. 1, the light emitters 26 and light detectors 27 of the first channel occupy the lower level, while the emitters 26' and detectors 27' of the second channel occupy the upper level. For some applications, it may be desirable to position the light emitters of both channels at one level and the light detectors of both at the other level. Such an arrangement can provide mechanical layout and electrical wiring advantages. While the light detectors will then be vertically displaced from the corresponding light emitters, the spread of the light beam is usually sufficient to accommodate this displacement or the light emitters and detectors can be mounted toward one another at an angle to the base 21.

While eight columns and eight rows are shown in FIG. 1 for purposes of illustration, the size of the system can be extended to any reasonable extent.

Figure 2A:
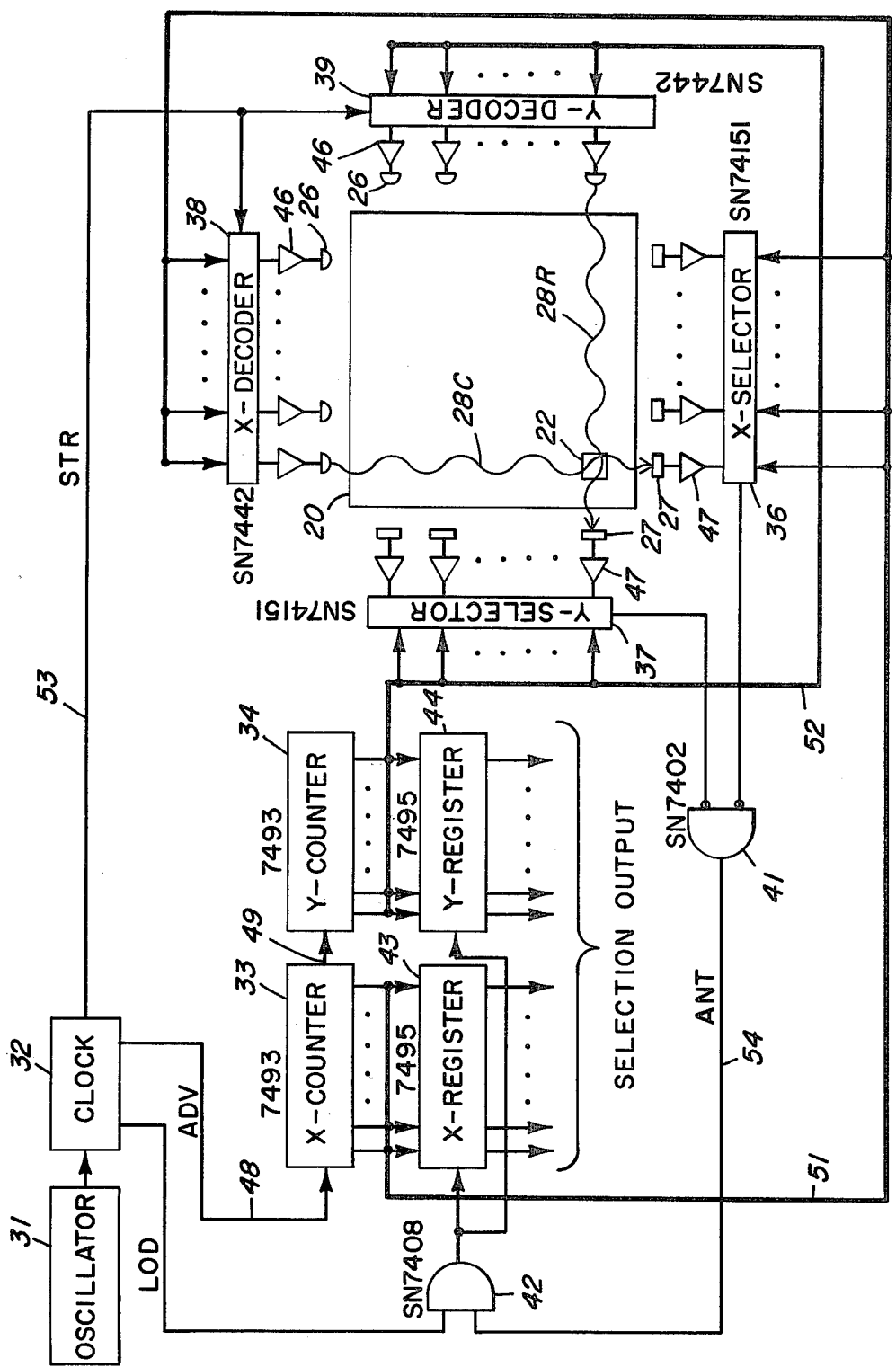
FIG. 2A is a diagrammatic view of a selection system according to the invention.
Figure 2B:
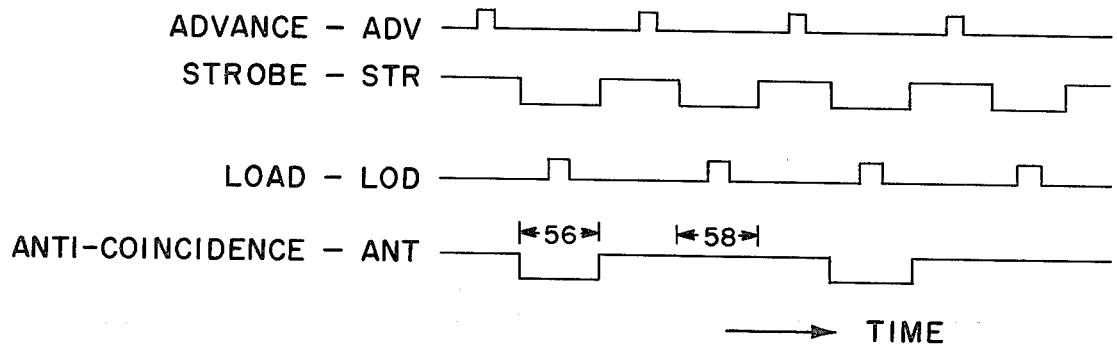
FIG. 2B illustrates the circuit operating signals.

The selection system circuitry is illustrated in block diagram form in FIG. 2A, while the operating signals thereof and their time relationship are shown in FIG. 2B.

The selection system circuitry includes a signal generator or oscillator 31, a pulse generating or clock circuit 32, an X or column counter 33, a Y or row counter 34, an X-selector circuit 36, a Y-selector circuit 37, an X-decoder circuit 38, a Y-decoder circuit 39, an anti-coincidence NOR gate 41, a load AND gate 42, an X-register 43 and a Y-register 44.

X and Y light emitters 26 are arranged along adjacent sides of the map 20 of selection positions 22. Similarly, the light detectors 27 are arranged along opposite adjacent sides of the map 20 as described hereinbefore in connection with FIG. 1. The light emitters 26 are connected to decoder 38 or 39 through respective driver circuits 46. The light detectors 27 are connected to selector circuit 36 or 37 through suitable amplifiers 47.

Example embodiments of oscillator 31, clock 32, drivers 46 and light pulse detectors 47 are described hereinafter. The other circuits of FIG. 2A may be known integrated circuits of the type indicated or the equivalent. Light emitters 26 may be known light emitting diodes, preferably infra-red emitters, while the light detectors 27 may be known photo-transistors sensitive to infra-red light. Operation with infra-red light reduces the possibility of interference by ambient light and better matches the peak sensitivity of silicon photo transistors.

The oscillator 31 produces a standard or time base signal to the clock 32 which generates operating signals or pulses ADV (advance), STR (strobe) and LOD (load) in the time sequence shown in FIG. 2B.

Each pulse ADV is applied over a line 48 to up-count the X-counter 33. When the X-counter 33 reaches its full count, the next ADV pulse resets it to zero and a secondary advance pulse is produced on a line 49 which up-counts the Y-counter 34. That is, for each cycle of operation of the X-counter, the Y-counter is up-counted one count.

Signal levels indicative of the states of the X-counter stages are conducted by a cable 51 to the inputs of respective stages of the X-register 43, X-selector 36 and X-decoder 38 (the inputs to the X-register being internally gated). Outputs of the stages of the Y-counter 34 are similarly connected by a cable 52 to Y-register 44, Y-selector 37 and Y-decoder 39.

The X-decoder 38 converts the binary pattern of the X-counter output signals to one out of C pattern (where C is the number of outputs of the decoder and hence the number of columns of the map 20) and enables the decoder output to the corresponding light emitter driver 46. The X-selector 36 similarly decodes the X-counter pattern and enables the light detector 27 of the column corresponding to the enabled light emitter driver 46 (all other light detectors of the columns remaining disabled).

In a similar manner, the Y-decoder 39 and Y-selector 37 convert the signal pattern from the Y-counter 34 and enable the light emitter driver 46 and the light detector 27 of the one row corresponding to the state of the Y-counter.

Now upon occurrence of the strobe pulse STR, on a line 53 to inputs of decoders 38 and 39, the enabled light emitter drivers 46 energize their respective light emitters 26 to produce, for example, a light beam 28C along one column and a light beam 28R along one row. If there is no obstruction of both of the light beams 28C and 28R, the respective light detectors 27 produce at least one signal which, through the X-selector and Y-selector circuits, is applied to an input of anti-coincidence NOR gate 41. In response to this signal, the gate 41 produces a negative or disabling anti-coincidence pulse ANT on a line 54 to an input of load AND gate 42 (as shown, for example, at 56 in FIG. 2B). In this event, occurrence of the load pulse LOD on a line 57 to the other input of gate 42 produces no output signal from this gate.

On the other hand, if both of the light beams 28C and 28R are obstructed, as by placing a suitable stylus at their intersection at selection position 22, the state of NOR gate 41 is not changed and an enabling level of the signal ANT (as shown, for example, at 58 in FIG. 2B) remains at the input of AND gate 42. In this event, the AND gate 42 is responsive to the occurrence of the signal LOD to apply a transfer signal to the X-register 43 and to the Y-register 44. This causes the stages of the X-register and Y-register to assume the states of their counterparts in the X-counter and Y-counter whereby representations of the X-Y (column and row) coordinates of the selected selection position 22 are stored, the registers 43 and 44 providing selection output signals which can be decoded, or otherwise processed, and used for any chosen selection or control purpose such as enablement of the control mechanism of a selected control rod of a nuclear reactor core.

The selection representations in the X-register and Y-register remain until another selection is made by obstructing the light beams at another selection position.

It is believed clear that additional X and Y registers, together with suitable logic circuitry can be provided to store more than one selected selection position if such is desired.

As the X-counter and Y-counter are operated through successive cycles by the advance pulse ADV, the light emitters and corresponding light detectors are successively and repetitively or cyclically strobed or scanned column by column and row by row. Since the light detectors are strobed along with the respective light emitters, no light collimating means is needed.

Where a redundant channel is to be provided, the circuitry of FIG. 2A is duplicated for the second channel. Where redundant channels are used, the light obstructing stylus 29 (FIG. 1) used for selection preferably has a surface finish which reflects a minimum of light (such as a black matte finish). If a reflective obstruction, such as a finger, is used, light may be reflected from an energized light emitter of one channel to a vertically adjacent enabled light detector of the other channel (particularly for position selections near the periphery of the map 20). Where it is desirable to use a reflective obstruction, this potential problem can be overcome by suitably synchronizing the operating signal generators of the two channels so that the operating signals thereof are out of phase.

Figure 3:
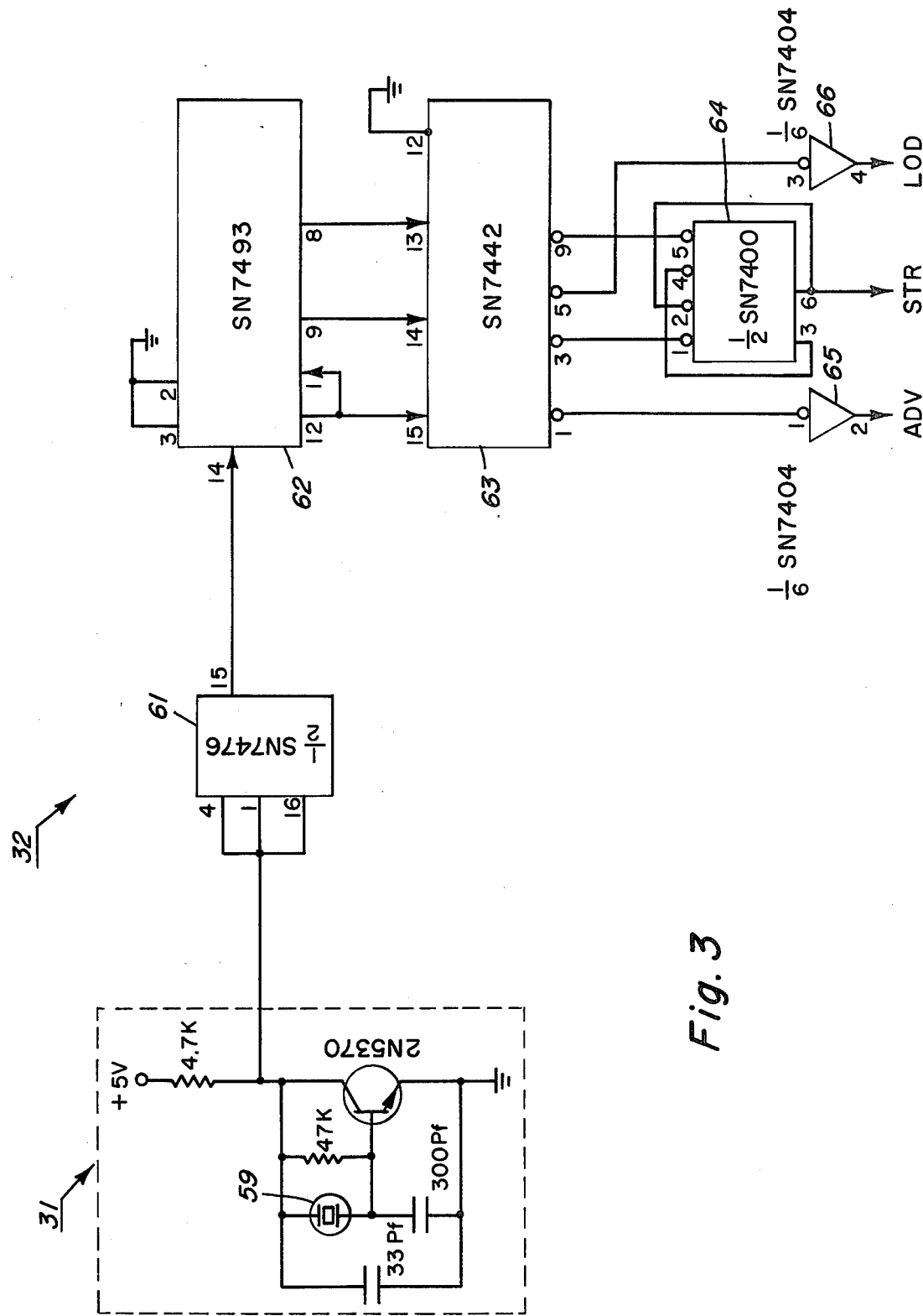
FIG. 3 is a schematic diagram of an embodiment of a signal generator.

Example embodiments of the oscillator 31 and clock circuit 32 are illustrated in FIG. 3. The oscillator 31 comprises a conventional oscillator circuit and typical component values and type numbers are given. The frequency of oscillation is controlled by a crystal 59. In the example embodiment the operating frequency is 5 MHZ, which may be higher or lower as desired within the operating capability of the clock and selection circuits.

The clock circuit 32 is formed of a JK flip-flop 61, a pulse counter 62, a decoder 63, a set-reset flip-flop 64 and inverter amplifiers 65 and 66. The circuits 61, 62, 63, and 64 may be known integrated circuits and typical type numbers and pin connections are shown.

The JK flip-flop 61 receives the signal from the oscillator 31, divides it by two and provides a train of square wave pulses to the counter 62.

The counter 62 is connected as a recycling three stage counter which therefore continuously cycles through its eight binary stages in response to the pulses from flip-flop 61.

Output signals from the stages of counter 62 are supplied to the decoder pins 13, 14 and 15. The decoder 63 converts the pattern of binary input signals to a one out of eight output signal pattern, the decoder thus being cycled along with counter 62. The decoder output signal, which appears successively on its pins 1, 3, 5 and 9 during each cycle, are used to provide the ADV, STR and LOD operating signals, as shown in FIG. 2B as follows: In its zero state, the decoder 63 produces an output signal on pin 1, which, through inverting amplifier 65, provides the signal ADV. Pin 3 is connected to the set input of flip-flop 64, which produces the signal STR as the decoder output signal appears successively on pins 3–7. The flip-flop 64 is reset by the decoder output signal on pin 9. The signal LOD is taken from pin 5 through inverting amplifier 66.

Figure 4:
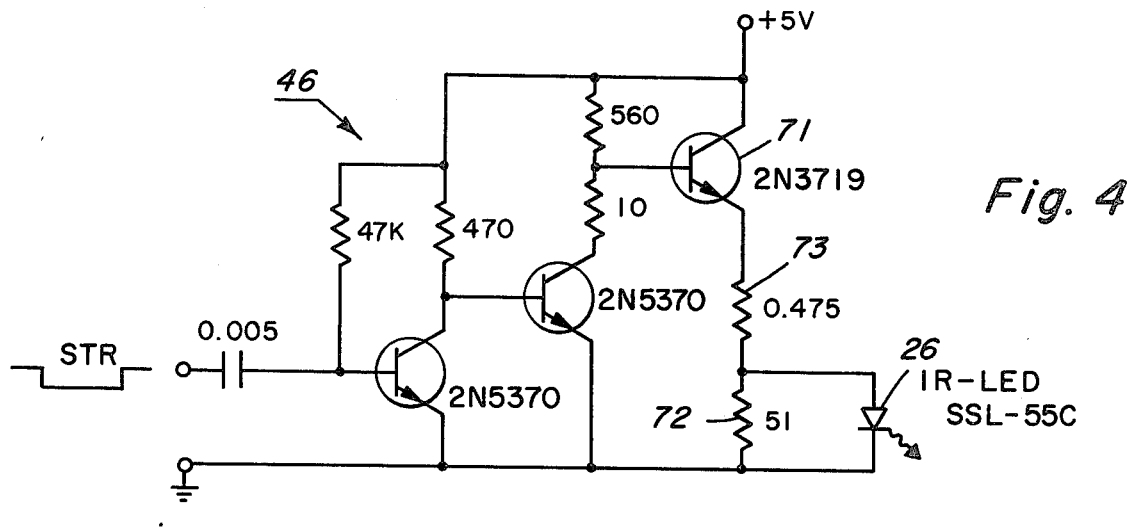
FIG. 4 is a schematic diagram of an embodiment of a light source driving circuit.

A suitable embodiment of a driver circuit 46 for light emitters 26 is shown in FIG. 4 wherein the light emitter 26 is illustrated as an infra-red light emitting diode (LED) type number SSL-55C available from the General Electric Company. Typical component values and transistor type numbers are given, the resistor values being in ohms and the capacitor values being in microfarads.

When the circuit receives the negative strobe pulse (through decoders 38 and 39), a driver transistor 71 is driven into saturation. This causes current flow through resistor 3 and hence, through the LED and a resistor 72. The value of resistor 73 is selected to provide the desired LED operating current while the value of a resistor 72 is selected to limit the inductive transient during turnoff.

Figure 5:
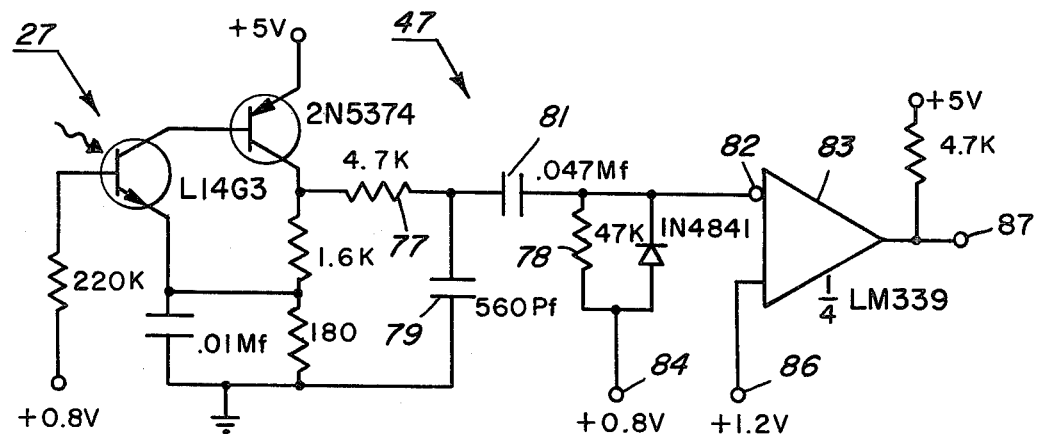
FIG. 5 is a schematic diagram of an embodiment of a light pulse detecting circuit.

A suitable embodiment of a light pulse detector circuit 47 is shown in FIG. 5 wherein the light detector 27 is a photo transistor, the output signal of which is amplified by a transistor 75. Resistors 77 and 78 and capacitors 79 and 81 form a band pass network to reject electrical noise and signals due to slow changes in ambient light. The output of this network is applied to an input terminal 82 of a voltage comparator 83. Reference voltages at terminals 84 and 86 establish the bias point and pulse height threshold for voltage comparator 83. Comparator 83 produces a logical low output signal at output terminal 87 whenever the signal voltage at input terminal 82 is more positive than the reference voltage at terminal 86.

Thus, what has been described is a light beam operated, nonmechanical selection system, with means for a redundant channel, which can accommodate a relatively high density of selection positions without the necessity of expensive, bulky collimated light sources.

As will be apparent to those skilled in the art, various modifications and changes may be made to the embodiments described herein within the spirit and scope of the invention as set forth in the claims.

What is claimed is:

1. A selection system including a two-dimensional map of a plurality of selection positions arranged in columns and rows comprising: a selectively energizable light emitter at one end of each of said columns for emitting light in the direction of the columns; a normally disabled light detector at the other end of each of said columns for receiving light from the light emitters of the columns and responsive thereto to produce an output signal; means for successively energizing the light emitters of said columns, means for successively enabling the light detectors of said columns in synchronism with the energization of the light emitters thereof whereby the light detector of a column is enabled only in coincidence with the energization of the light emitter of the column; and column detection means for indicating the absence of an output signal from an enabled light detector of said columns.

2. The selection system of claim 1 further including a separate redundant system of the elements defined therein wherein the emitters and detectors of the redundant system are displaced from the emitters and detectors of the first system in a direction perpendicular to said map and wherein a light detector of said redundant system is positioned at said one end of each of said columns and a light emitter of said redundant system is positioned at said other end of each of said columns whereby interference between the two systems is avoided.

3. The selection system of claim 1 further including: a selectively energizable light emitter at one end of each of said rows for emitting light in the direction of said rows; a normally disabled light detector at the other end of each of said rows for receiving light from the light emitters of the rows and responsive thereto to produce an output signal; means for successively energizing the light emitters of said rows; means for successively enabling the light detectors of said rows in synchronism with the energization of the light emitters thereof whereby the light detector of a row is enabled only in coincidence with the energization of the light emitter of the row; and row detection means for indicating the absence of an output signal from an enabled light detector of said rows.

4. The selection system of claim 3 further including a separate redundant system of the elements defined therein wherein the light emitters and detectors of the redundant system are displaced from the emitters and detectors of the first system in a direction perpendicular to said map and wherein the positions of light emitters and light detectors of the redundant system are reversed with respect to the light emitters and light detectors of the other system whereby interference between the two systems is avoided.

5. The selection system of claim 3 wherein said means for successively energizing the light emitters of said columns includes means for energizing the light emitters of said columns through successive cycles of successive energization and wherein said means for successively energizing the light emitters of said rows advances the successive energization of the light emitters of said rows one row for each cycle of energization of the light emitters of said columns.

6. The selection system of claim 5 including position indicating means responsive to indications from said column detection and row detection means for indicating the intersection of a column and a row in which the absence of output signals from the light detectors thereof is indicated.

7. The selection system of claim 6 wherein said position indicating means includes a light source located at said intersection on said map.

8. In a selection system including a map of a plurality of selection positions arranged in columns and rows with a normally unenergized light emitter and a respective normally disabled light detector at opposite ends of each of said columns and rows, a method for detecting a light obstruction at one of said selection positions at the intersection of one of said columns and one of said rows comprising the steps of:
    (1) energizing the light emitters and enabling the respective light detectors of said columns sequentially and cyclically;
    (2) energizing the light emitters and enabling the respective light detectors of said rows sequentially and in synchronism whereby each light detector is enabled only in coincidence with the energization of its respectively associated light emitter, advancing one row for each cycle of operation of the light emitters and detectors of said columns; and
    (3) detecting the coincidence of the absence of light at enabled light detectors at one of said columns and one of said rows during a cycle of operation of the light emitters and detectors of said rows.

9. The method of claim 8 further including the step of providing means for registering an identifying indication of the selection position corresponding to said one of said columns and said one of said rows.

10. A selection system including a two-dimensional map of a plurality of selection positions arranged in X coordinate columns and Y coordinate rows comprising: a light emitter at one end of each of said columns and each of said rows for emitting light when energized in the direction of the columns and the rows; a light detector at the other end of each of said rows for producing when enabled an output signal in response to light from said light emitters; a clock pulse generator producing a train of advance pulses and coincident, strobe and load pulses intermediate of the advance pulses; a recycling X-counter having a number of different states equal to the number of said columns; means for applying said advance pulses to said X-counter and said X-counter advancing to a different one of its states in response to each advance pulse; an X-decoder having a number of outputs equal to the number of said columns connected to respective light emitters of said columns; means for applying X-counter output signals indicative of the state of said X-counter to said X-decoder; means for applying said load pulse to said X-decoder, said X-decoder being responsive to the signals from said X-counter and a load pulse for energizing the one of said light emitters of the column corresponding to the state of said X-counter; an X-selector having a number of normally disabled inputs equal to the number of said columns connected to respective light detectors of said columns; and means for applying said X-counter output signals indicative of the state of said X-counter to said X-selector, said X-selector being responsive thereto to enable the one input thereof connected to the light detector of the column corresponding to the state of said X-counter, said X-selector producing an absence of light signal indicative of the event of the absence of a signal from said light detector of the column corresponding to the state of said X-counter when said one of the light emitters of the column corresponding to the state of said X-counter is energized.

11. The system of claim 10 further including: means for producing a secondary advance pulse each cycle of operation of said X-counter; a recycling Y-counter having a number of different states equal to the number of said rows; means for applying said secondary advance pulse to said Y-counter and said Y-counter advancing to a different one of its states in response thereto; a Y-decoder having a number of outputs equal to the number of said rows connected to respective light emitters of said rows; means for applying Y-counter output signals indicative of the state of said Y-counter to said Y-decoder; means for applying said load pulse to said Y-decoder, said Y-decoder being responsive to the signals from said Y-counter and a load pulse for energizing the one of said light emitters of the row corresponding to the state of said Y-counter; a Y-selector having a number of normally disabled inputs equal to the number of said rows connected to respective light detectors of said rows; and means for applying said Y-counter output signals indicative of the state of said Y-counter to said Y-selector, said Y-selector being responsive thereto to enable the one input thereof connected to the light detector of the two corresponding to the state of said Y-counter, said Y-selector producing an absence of light signal indicative of the event of the absence of a signal from said light detector of the row corresponding to the state of said Y-counter when said one of the light emitters of the column corresponding to the state of said Y-counter is energized.

12. The system of claim 11 further including: a first gate having inputs connected to receive absence of light signals from said X-selector and said Y-selector and responsive to coincident absence of light signals therefrom to produce an enabling output signal; an X-register with connections to detect the state of said X-counter; a Y-register with connections to detect the state of said Y-counter; a second gate having inputs connected to receive said enabling signal and said load pulse and responsive to the coincident occurrence thereof to apply a transfer signal to said X-register and said Y-register to thereby cause said X-register and said Y-register to assume states equivalent to said X-counter and Y-counter, respectively.

* * * * *